(12) United States Patent
Connors et al.

(10) Patent No.: US 7,053,928 B1
(45) Date of Patent: May 30, 2006

(54) METHOD AND SYSTEM FOR COMBINING MULTI-SPECTRAL IMAGES OF A SCENE

(75) Inventors: Clifford James Connors, Tempe, AZ (US); Michael Jude Iosue, Phoenix, AZ (US); Timothy Everett Ostromek, Garland, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/528,552

(22) Filed: Mar. 20, 2000

(51) Int. Cl.
*H04N 7/18* (2006.01)

(52) U.S. Cl. ..................................... 348/164; 348/162
(58) Field of Classification Search ......... 348/160–170
See application file for complete search history.

(56) References Cited

U.S. PATENT DOCUMENTS

| | | | |
|---|---|---|---|
| 4,463,252 A | 7/1984 | Brennan et al. | 250/213 VT |
| 4,602,861 A | 7/1986 | Taniguchi et al. | 354/403 |
| 4,672,439 A * | 6/1987 | Florence et al. | 348/164 |
| 4,684,255 A * | 8/1987 | Ford | 356/455 |
| 4,708,475 A * | 11/1987 | Watson | 356/417 |
| 4,751,571 A | 6/1988 | Lillquist | 358/113 |
| 4,786,966 A * | 11/1988 | Hanson et al. | 348/158 |
| 5,035,472 A | 7/1991 | Hansen | 350/1.1 |
| 5,557,451 A | 9/1996 | Copenhaver et al. | 359/350 |
| 5,729,010 A | 3/1998 | Pinkus et al. | 250/214 VT |
| 5,903,996 A * | 5/1999 | Morley | 42/115 |
| 5,910,816 A | 6/1999 | Fontenot et al. | 348/65 |
| 6,088,165 A * | 7/2000 | Janeczko et al. | 359/629 |
| 6,377,367 B1 * | 4/2002 | Suganuma | 359/1 |
| 6,445,365 B1 * | 9/2002 | Taniguchi et al. | 345/9 |

OTHER PUBLICATIONS

Litton Systems, Inc.; Electro-Optical Systems; Sense The Heat?; © 1999 Litton Systems, Inc.
Litton Systems, Inc.; Electro-Optical Systems; "Hand-Held Thermal Imager"; "Sophie"; © 1999 Litton Systems, Inc.
International Search Report in PCT International Application No. PCT/US01/05258, dated Jun. 25, 2001.

* cited by examiner

*Primary Examiner*—Anand Rao
(74) *Attorney, Agent, or Firm*—Fulbright & Jaworski LLP

(57) ABSTRACT

A system (100) for combining multi-spectral images of a scene (102) is disclosed. The system (100) is compatible with a viewing system (104) for viewing the scene (102) in a first spectral range. The viewing system (104) has an objective lens (110), an image intensifier (112) and viewing optics (114). There is a detector (128) for viewing the scene (102) in a second spectral band. The detector (128) has an image output (129) representative of the viewed scene. A display (132) for receiving and displaying the image output is provided. There is a collimator (134) for receiving and projecting the displayed image. A beam mixer (118) is provided for receiving both the viewed scene in the first spectral band and the displayed image and conveying the combined images to the viewing system (104) to construct the combined multi-spectral images of the scene. The system may also be used stand-alone without the viewing system (104).

40 Claims, 3 Drawing Sheets

METHOD AND SYSTEM FOR COMBINING MULTI-SPECTRAL IMAGES OF A SCENE

TECHNICAL FIELD OF THE INVENTION

This invention relates generally to the field of electro-optics and, more specifically, to a method and system for combining multi-spectral images of a scene.

BACKGROUND OF THE INVENTION

Various systems are known for displaying visual images of a scene using electromagnetic radiation of a specific spectral region or band. For instance, infrared (IR) devices are employed in numerous applications for both civilian and military purposes. It is also known to observe a scene in an extreme low light environment using light amplification or intensification such as night vision equipment employing image intensifier technology. An example of a night vision device is the night vision goggle designated by the U.S. military as an AN/PVS-7. Another night vision device is described in U.S. Pat. No. 4,463,252. Different devices are needed for displaying scenes in different spectral ranges or bands because different information is conveyed through the different spectra. While various techniques have been employed to combine multi-spectral images of a single scene, they share various disadvantages and deficiencies.

One technique known for combining an infrared image with an image displayed at visible wavelengths is described in U.S. Pat. No. 4,751,571 to Lillquist. The system disclosed in this patent has two separate image paths. One path transmits visible light to an image intensifier while a second path transmits thermal IR to an IR detector. Both the intensified image and the IR image are converted to electronic video signals. The two electronic signals are then mixed at a video mixer and then displayed on a color monitor. The technique described in the Lillquist patent has the disadvantage of requiring that both signals be electronically converted and electronically combined before being displayed to a user. Such electronic conversion will loose the very high resolution of the night vision device. Additionally, the Lillquist approach requires a dedicated system not usable with the vast population of existing night vision devices.

Another image fusion system is described in U.S. Pat. No. 5,035,472 to Hansen. This patent describes a device that conveys the image along two separate paths. One path directs the image to an IR detector which produces an IR image. The IR image is then transmitted to a CRT which displays the image. A second path directs the image of the scene to an image intensifier tube which generates an intensified image which also produces a visual display of the image. The displayed IR and intensified images are optically combined for display to a user. The technique described in the Hansen patent requires both images to be visibly generated before they are optically combined behind the image intensifier. This approach has the disadvantage of requiring a dedicated system not usable with the vast population of existing night vision devices.

Another technique calls for detecting a scene using multiple sensors which convert the images to digital data and then algorithmically combine the data using microelectronic processors. The disadvantages of this approach are that it is time consuming, requires substantial processing power, and the high resolution of a night vision channel cannot be captured electronically.

All of these techniques suffer from the primary disadvantage of not being capable of use with pre-existing direct view devices. For instance, none of these devices is capable of operation with existing night vision equipment.

While these devices and methods have provided a significant improvement over prior approaches, the challenges in the field of electro-optics has continued to increase with demands for more and better techniques having greater flexibility and adaptability. Therefore, a need has arisen for a new modular method for combining multi-spectral images of a scene.

SUMMARY OF THE INVENTION

In accordance with the present invention, a method and system for combining multi-spectral images of a scene is provided that substantially eliminates or reduces disadvantages and problems associated with previously developed systems and methods. Multi-spectral is defined in this disclosure as two or more separate sensors with distinct response to an assigned spectral region. These regions may be completely different without any overlap, or very similar with virtually complete overlap, or anything else in-between.

A system for combining multi-spectral images of a scene is disclosed. The system comprises a channel for transmitting a scene in a first spectral band. There is a detector for sensing the scene in a second spectral band, this detector has an image output representative of the viewed scene. A display for receiving the representative image output and visibly displaying a displayed image in the first spectral band is provided. There is a collimator for receiving and projecting the displayed image. A beam mixer is provided for combining both the transmitted scene in the first spectral band with the displayed image and conveying the combined multi-spectral image to an output.

The system may also have an intensifier system for viewing the scene in the first spectral band. The intensifier system has an objective lens, an image intensifier and viewing optics. In this embodiment, the combined multi-spectral image is conveyed through the output to the intensifier system to display the combined multi-spectral images of the scene.

A method for combining multi-spectral images of a scene is disclosed. The method comprises nine steps. Step one calls for receiving an image of the scene in a secondary spectral range at a detector. Step two requires generating a video representation of the image. Step three provides transmitting the video representation to a display. In step four, the method provides for generating a visual representation of the image at the display. The next step calls for relaying the visual representation of the image. Step six calls for receiving the image in a primary spectral range. Step seven provides for combining the collimated displayed image with the image in the primary spectral range. The eighth step calls for transmitting the combined images to an output. The last step provides for viewing the combined multi-spectral image of the scene. In an alternative embodiment, the combined images are amplified by a primary imaging system such as an image intensifier.

A technical advantage of the present invention is a single scene may be observed using two spectral images. Another technical advantage of the present invention is that existing intensifier (or other imaging) systems, such as night vision goggles, may be adapted to display multi-spectral images of a single scene. Other technical advantages will be apparent to those skilled in the art.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE DRAWINGS

Figure 1:
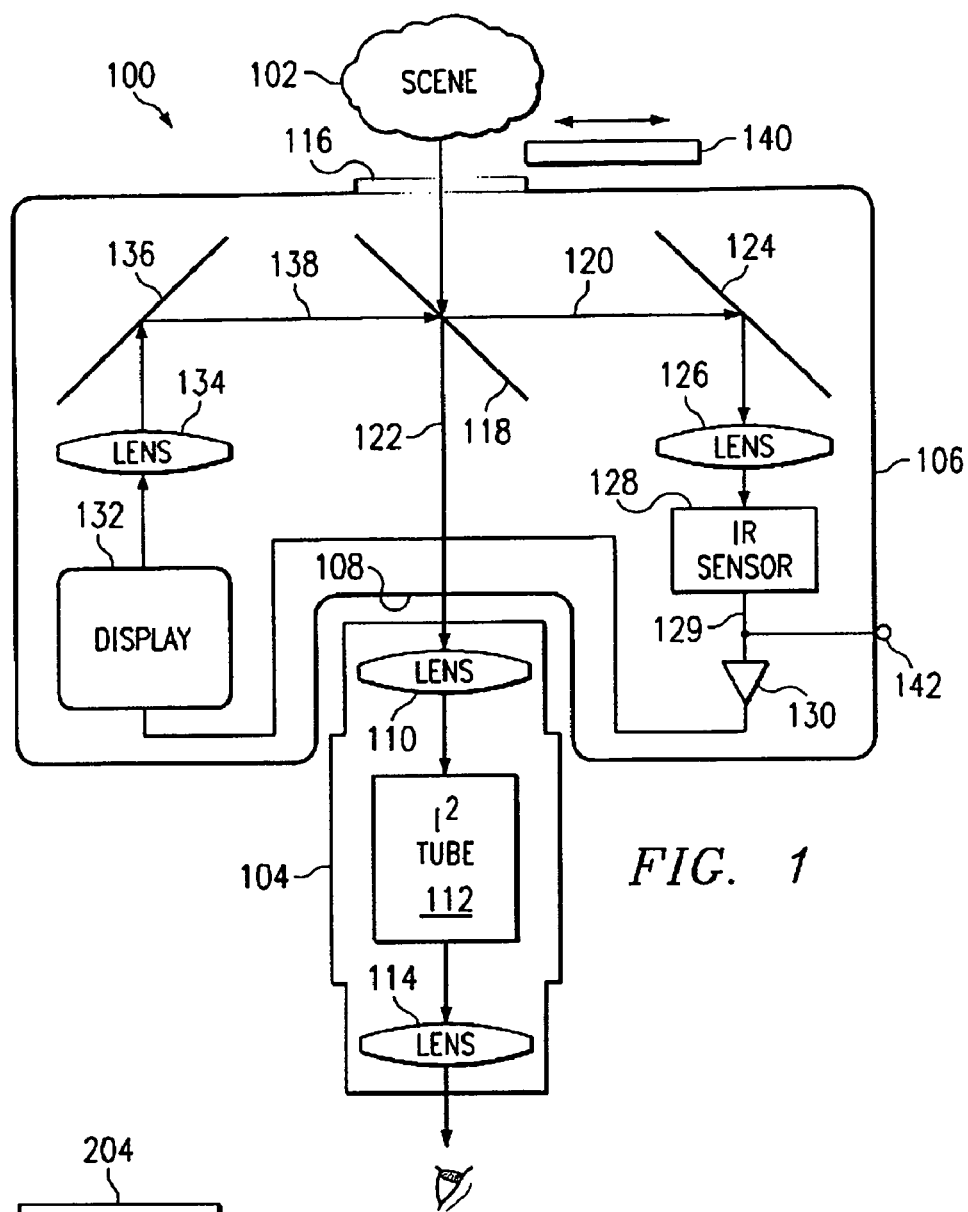
FIG. 1 illustrates a system for combining multi-spectral images of a scene in accordance with one embodiment of the present invention.

FIG. 1 illustrates a system for combining multi-spectral images of a scene in accordance with one embodiment of the present invention. A system 100 for combining multi-spectral images of a scene 102 includes a viewing system 104, such as a pre-existing image intensifier system, and a multi-spectrum image adapter 106. Multi-spectrum image adapter 106 is coupled to viewing system 104 at coupler 108. For direct viewing using adapter 106 without the viewing system 104, viewer 200 shown in FIG. 2 may be attached or coupled to adapter 106 at coupler 108.

Viewing system 104 may be a presently existing intensifier system such as a night vision goggle or monocular. Examples of currently existing night vision equipment suitable for use in connection with the present invention include the following: the AN/PVS-7, the AN/PVS-14 or the AN/PVS-18. Alternatively, a video or still camera could be used in place of viewing system 104. Viewing system 104 is comprised of an objective lens 110, an image intensifier tube 112 and viewing optics 114. While objective lens 110 and viewing optics 114 are each depicted as a single lens, it is intended that they may comprise multiple optical elements as is well known to those skilled in the art. Similarly, viewing optics 114 may also comprise multiple optical elements and may be either a monocular or binocular system.

Referring now to multi-spectral adapter 106, a single aperture 116 is provided for receiving an image of scene 102 in multiple spectral ranges or bands. The electromagnetic radiation either generated by or reflected from scene 102 passes through a broad band transmitting aperture 116 and is split at dichroic mirror 118. As will be subsequently explained, mirror 118 also performs the function of combining images as a beam mixer. At splitting mirror 118 two separate optical paths 120 and 122 are created. In the disclosed embodiment, electromagnetic radiation in the mid or far IR region follows path 120 where it is reflected by mirror 124 to lens 126 which focuses the IR radiation on IR sensor 128. Examples of IR sensors useful in practicing the present invention are the Lockheed Martin LIMIRIS IR sensor or the Nytec Boeing IR micro-bolometer sensor U3000. Either of these sensors will generate an analog signal output representative of the IR image of scene 102. The video output 129 of IR sensor 128 is transmitted to electronics 130 for further processing. The electronic output of video output 129 is also available for external transmission through data port 142. Conversely, symbology generated externally may be transmitted in through data port 142 for presentation at the display 132. In such an embodiment, data port 142 will be bi-directional. In alternative embodiments not shown, more than one data port may be provided to serve multiple functions. Video output 129 is then input to display 132 which converts the IR image signal to a visual representation of the IR image. An example of display 132 is an active matrix emissive display. That visual representation of the IR image is collimated by lens 134, and folded by mirror 136 which directs the image along path 138 to dichroic mirror 118 where the image is reflected along path 122 to the objective lens 110 of viewing system 104. Electromagnetic radiation, such as visible light, is received from scene 102. The beam passes through aperture 116 then through mirror 118 following path 122 to the objective lens 110 of viewing system 104. In this way an image of the scene in the visible region or primary spectral range is combined with an image of the scene depicting the infrared region or secondary spectral range for observation by a user through viewing system 104.

Adapter 106 also includes filter 140 which is operable to cover aperture 116 and is selected to filter out predetermined spectral ranges. For instance, filter 140 may be adapted to block visual and near infrared should it be desired to use system 100 in a mode of operation to solely view the IR portion. It is also possible to construct filter 140 so that multiple spectral ranges may be filtered out to enhance certain scenes.

Figure 2:
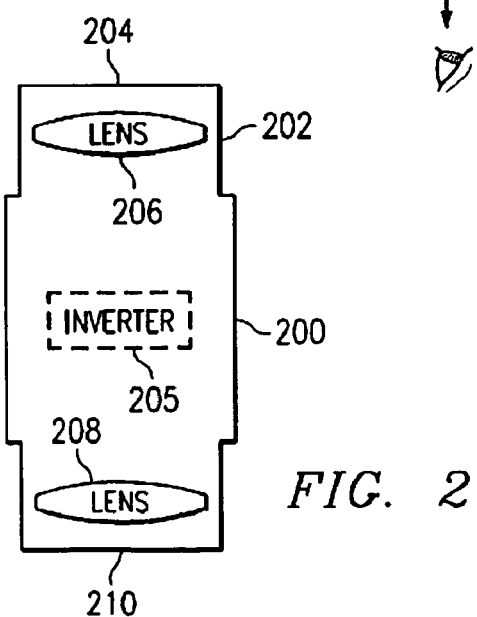
FIG. 2 illustrates a viewer used in connection with the system of FIG. 1.

FIG. 2 illustrates a telescopic viewer 200 used in connection with the system of FIG. 1. Viewer 200 has input adapter 202 for mating with coupler 108 of adapter 106. In this way, viewer 200 is substituted for viewing system 104 if the user desires to observe the multi-spectral scene visually without an image intensifier. The image transmitted along path 122 enters viewer 200 at input 204 which conveys the beam through inverter 205 to objective lens 206 which then outputs the image to viewing optics 208 which presents the image to a user at eye piece 210. Inverter 205 inverts the image for upright presentation to the user.

Figure 3:
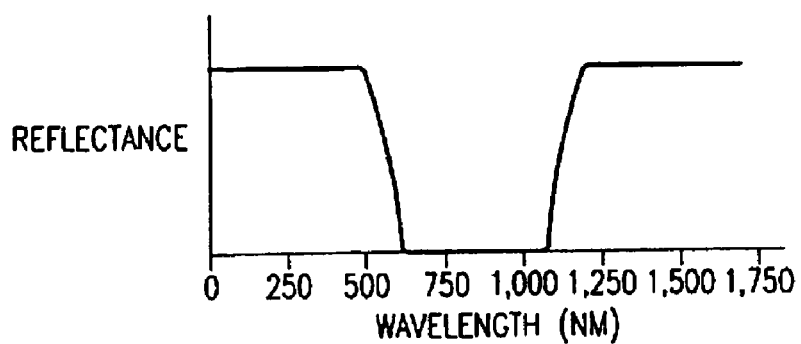
FIG. 3 illustrates a graph of reflectance vs. wavelength useful for matching a filter to a sensor in connection with the system of FIG. 1.

FIG. 3 illustrates a graph of reflectance vs. wavelength useful for matching filter 118 of FIG. 1, to a sensor, such as IR sensor 128, in connection with the embodiment of the present invention depicted in FIG. 1. Referring to FIG. 3, a selected filter with the reflectance versus wavelength characteristics shown in the graph will only permit radiation of wavelengths between approximately 600 nanometers and 1100 nanometers to pass through dichroic filter 118. Different spectral characteristics of filter 118 may be selected to conform to other spectral bands of operation.

Figure 4:
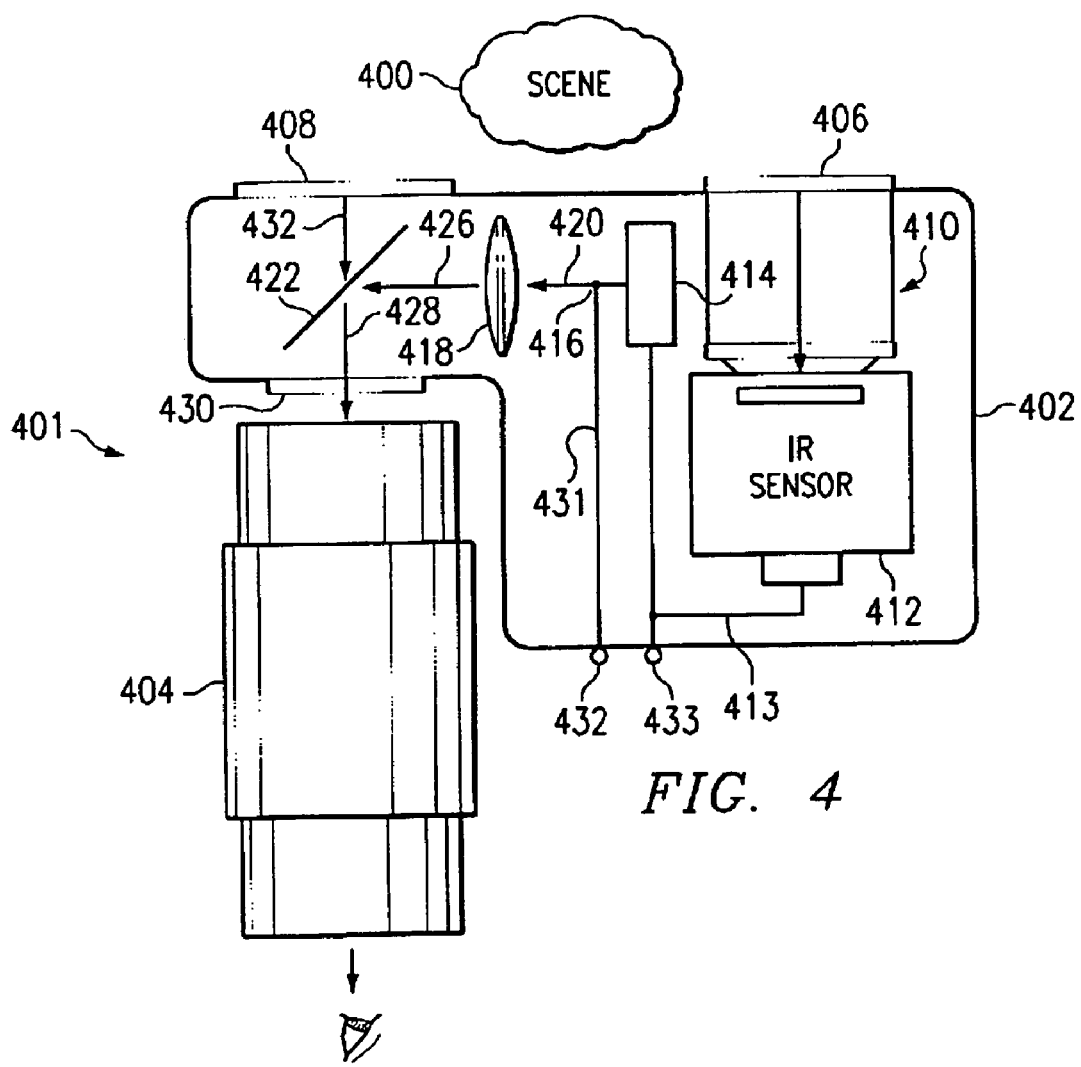
FIG. 4 illustrates a system for combining multi-spectral images of a scene in accordance with a second embodiment of the present invention.

FIG. 4 illustrates a system for combining multi-spectral images of a scene in accordance with a second embodiment of the present invention. Adapter module 402 is provided for coupling to a viewer 404 which may be a pre-existing intensifier system such as a night vision goggle. By coupling adapter module 402 to viewer 404, the combined system 401 permits the user of the pre-existing intensifier system to observe scene 400 in multiple spectral regions. Adapter module 402 has dual apertures 406 and 408 for receiving electromagnetic radiation either generated by or reflected off of scene 400. Such electromagnetic radiation enters adapter 402 at aperture 406 which is conveyed through IR objective assembly 410. IR objective assembly collects and focuses the IR radiation onto IR sensor 412 which converts the IR radiation to an electronic signal. The electronic output of IR sensor 412 is transmitted along electrical conductor 413 to display 414 where the electrical signal is converted to a visual output. The output of IR sensor 412 may also be externally transmitted via data port 433. In one embodiment, the output of IR sensor 412 would be an electronic signal, either analog or digital that may be processed by modifying the image electronically. In another embodiment, the output of display 414 is transmitted to data port 432 by a spatially coherent fiber optic bundle, or its equivalent, for observation or display to a user either locally or at a remote location. The visual output of display 414 is projected through optical element 416 which collimates the image and transmits the beam along path 426 to beam splitter 422. Beam splitter 422 combines the displayed image with the direct image of scene 400 in the visible spectrum through aperture 408. The image in the visible region passes through beam splitter 422. The combined image is transmitted to output 430 which is connected to viewer 404 where the combined images are available for viewing by a user. Both the IR image and the visible light image may be enhanced or isolated by the choice of suitable filters placed in front of apertures 406 and 408.

Figure 5:
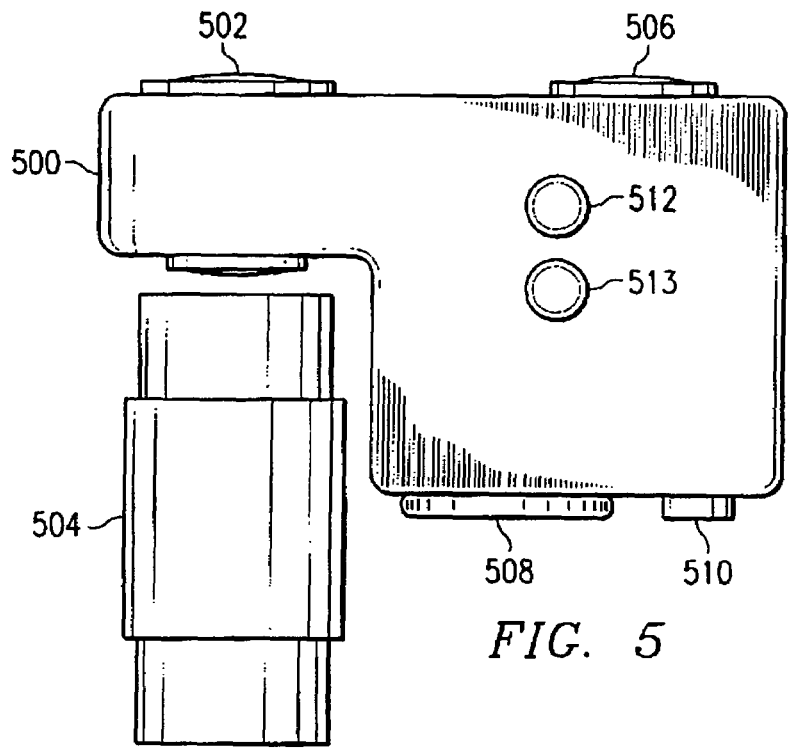
FIG. 5 illustrates a package for housing the system of FIG. 4.

FIG. 5 illustrates a package for housing the system of FIG. 4. Housing 500 is provided with opening 502 for receiving visible light in a first spectral range. Opening 502 corresponds to aperture 408 of FIG. 4. The visible light entering housing 500 through opening 502 is transmitted to a viewing system 504 such as a pre-existing image intensifier system or night vision device. Housing 500 is also provided with aperture 506 for receiving infrared radiation in a second spectral range. Aperture 506 corresponds to aperture 406 of FIG. 4 and is provided to convey the IR radiation to an IR sensor such as sensor 412 of FIG. 4. An energy supply, such as a battery, is provided at battery compartment 508. A data port 510 is also provided. Electronic control switches 512 and 513, for controlling various functions of the system would be coupled to suitable control electronics (now shown) within housing 500. The configuration shown in FIG. 5 provides for easy adaptation to currently existing night vision equipment such as night vision goggles or monoculars as well as normal visible day scopes of a similar configuration. This alternate embodiment depicted in FIGS. 4 and 5 allows for direct viewing of the multi-spectral image by positioning the eye behind aperture 430, without requiring use of a telescopic viewer such as viewer 200 shown in FIG. 2.

Figure 6:
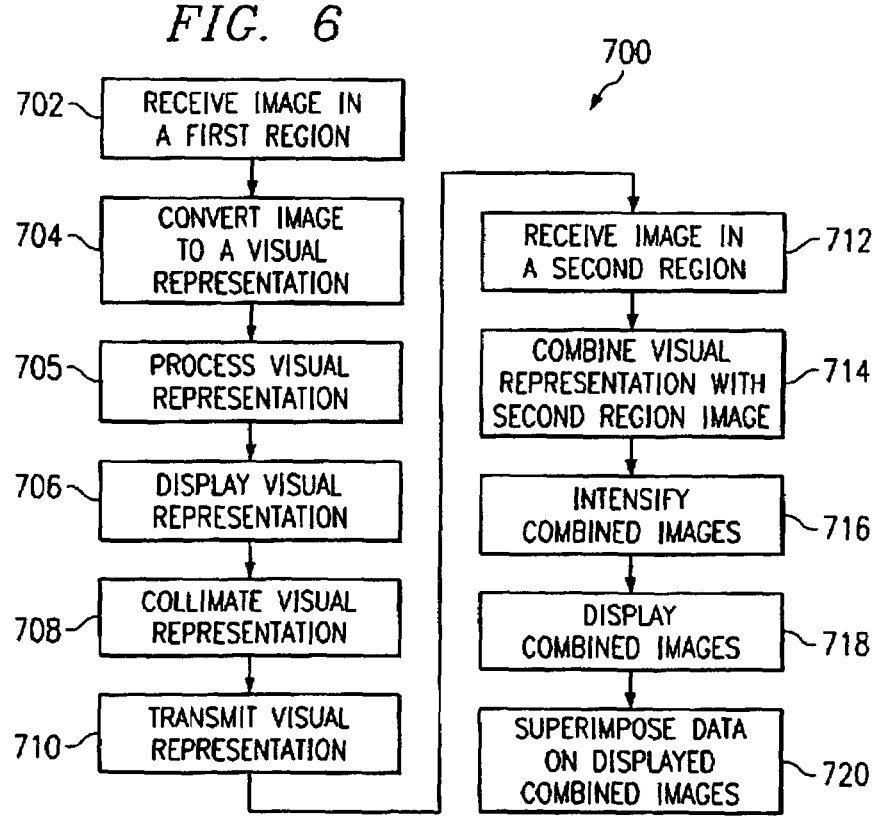
FIG. 6 is a flowchart demonstrating a method of combining multi-spectral images of a scene in accordance with the present invention.

FIG. 6 is a flowchart demonstrating a method of combining multi-spectral images of a scene in accordance with the present invention. Method 700 begins at step 702 where the multi-spectral adapter receives an image in a secondary spectral band. By way of example, the secondary band might be in the infrared spectrum. Alternatively, other bands such as the UV band may also be detected. In step 704, the image received in the secondary band is converted to a visual representation of the image. Using the example of an infrared detection system, a hot object will be generally displayed visually as brighter than its surrounding environment. In an alternative embodiment, at step 705, the visual representation of the image may be processed electronically. Processing the image includes modifying or enhancing the image as is well known to those skilled in the art. The visual representation of the image in the secondary band, or a processed version of that image, is then displayed at step 706. In one embodiment of the present invention, the image may be displayed externally by routing the signal to a data port for further transmission to other external display devices such as a video monitor, camera or radio transmitter for transmission to remote locations. The displayed visual image is then collimated at step 708 which would include collimating the image at a collimator. The collimated image is then transmitted in step 710 to a device for combining the visual representation with an image in the primary spectral band. A device useful for combining images would include a beam mixer or a beam splitter. In step 712, an image is received in the primary spectral band such as the visible spectrum. The visible image is then combined, at step 714, with the visual representation derived from the image in the secondary band. The combined images are then intensified at step 716. Typically, an image intensifier system such as a night vision goggle would be suitable for this purpose. At step 718, the intensified images are displayed as a combined single image for observation by a user. In an alternative embodiment, at step 720, other data or information may be superimposed on the displayed multi-spectral image. While the invention has been illustrated as a single device, it should be understood that the various components, such as the IR sensor 128, FIG. 1, or the IR sensor 412, FIG. 4, may be located remotely from the various other components.

Although embodiments of the invention and their advantages are described in detail, a person skilled in the art could make various alternations, additions, and omissions without departing from the spirit and scope of the present invention as defined by the appended claims.

What is claimed is:

1. A system for combining multi-spectral images of a scene, the system comprising:
   a channel for transmitting a scene image in a first spectral band;
   a detector for sensing the scene in a second spectral band, the detector having an image output representative of the scene;
   a display for receiving the image output and displaying a displayed image in the first spectral band;
   a collimator for receiving and projecting the displayed image; and
   a bean mixer for combining the transmitted scene in the first spectral band with the displayed image, and conveying the combined multi-spectral images to an output.

2. The system of claim 1 wherein the first spectral band is visible light.

3. The system of claim 1 wherein the second spectral band is in the infrared region.

4. The system of claim 1 wherein the display is an active matrix display.

5. The system of claim 1 further comprising a viewing system coupled to the output.

6. The system of claim 1 wherein the representative output of the detector is an analog video signal.

7. The system of claim 1 wherein the representative output of the detector is a digital video signal.

8. The system of claim 5 wherein the viewing system is a night vision device.

9. The system of claim 5 wherein the viewing system is a camera.

10. The system of claim 1 further comprising a data port for transmitting the scene image to a remote source.

11. The system of claim 1 further comprising a data port for receiving information from a remote source or other modular instrument.

12. The system of claim 1 further comprising a data port for receiving information from a remote source and wherein the display is adapted to receive and display data from the remote source.

13. The system of claim 1 wherein the first and second spectral bands share a common aperture.

14. The system of claim 1 wherein the first and second spectral bands have separate apertures.

15. The system of claim 5 wherein the viewing system has an objective lens assembly and an image intensifier.

16. The system of claim 5 wherein the viewing system has an objective lens assembly, and image intensifier and a viewing optics assembly.

17. A method for combining multi-spectral images of a scene, the method comprising:
  receiving an image of the scene in a first spectral range at a detector;
  generating a video representation of the image;
  transmitting the video representation to a display;
  generating a visual representation of the image at the display;
  relaying the visual representation of the image;
  receiving the image of the scene in a second spectral range;
  combining the relayed image with the image in the second spectral range;
  transmitting the combined images to an output; and
  displaying the combined multi-spectral images of the scene.

18. The method of claim 17 wherein the first spectral range is infrared.

19. The method of claim 17 wherein the second spectral range is in the visible region.

20. The method of claim 17 further comprising amplifying the combined images with an image intensifier system.

21. The method of claim 17 further comprising transmitting the visual representation of the image to a data port.

22. The method of claim 17 further comprising superimposing data on the combined multi-spectral images of the scene.

23. The method of claim 17 wherein the relaying step comprises collimating the visual representation of the image.

24. The method of claim 17 further comprising the step of processing the video representation of the image.

25. A method for combining multi-spectral images of a scene, the method comprising:
  receiving an infrared (IR) image of a scene at an infrared detector;
  generating a representation of the IR image;
  transmitting the IR image representation to a display;
  generating a visual representation of the IR image at the display;
  collimating the displayed IR image;
  combining the collimated IR image with an image of the scene in a second spectral region;
  transmitting the combined images to an intensifier system operable to intensify images in the second spectral region; and
  displaying the combined images of the scene.

26. The method of claim 25 wherein the second spectral region is visible light.

27. The method of claim 25 wherein intensifier system is a night vision goggle.

28. The method of claim 25 wherein the IR image is received at a first aperture and the image of the scene in the second spectral region is received at a second aperture.

29. The method of claim 25 wherein the visual representation of the IR image is displayed at an external viewer.

30. The method of claim 25 further comprising transmitting the visual representation of the image to a data port.

31. The method of claim 25 further comprising superimposing data on the combined multispectral images of the scene.

32. The method of claim 25 further comprising processing the IR image representation.

33. A system for combining multi-spectral images of a scene, the system comprising:
  a viewing system for viewing the scene in a first spectral range, the viewing system having an objective lens and viewing optics;
  a detector for viewing the scene in a second spectral range, the detector having an image output representative of the viewed scene;
  a display for receiving and displaying the image output;
  a collimator for receiving and projecting the displayed image; and
  a beam mixer for receiving the viewed scene in the first spectral range and the displayed image and conveying both images to the viewing system to construct the combined multi-spectral images of the scene.

34. The system of claim 33 wherein the viewing system further comprises an image intensifier.

35. The system of claim 33 wherein the first spectral range is visible light.

36. The system of claim 33 wherein the second spectral range is in the infrared band.

37. The system of claim 33 wherein the display is an active matrix.

38. The system of claim 33 wherein the viewing system is a night vision device.

39. The system of claim 33 wherein the representative output of the detector is an analog video signal.

40. The system of claim 33 wherein the representative output of the detector is a digital video signal.

* * * * *